United States Patent
Braun

(10) Patent No.: US 7,228,223 B2
(45) Date of Patent: Jun. 5, 2007

(54) METHOD FOR MONITORING AN EXHAUST GAS SYSTEM OF A MOTOR VEHICLE

(75) Inventor: Tillmann Braun, Berglen (DE)

(73) Assignee: DaimlerChrysler AG, Stuttgart (DE)

( * ) Notice: Subject to any disclaimer, the term of this patent is extended or adjusted under 35 U.S.C. 154(b) by 34 days.

(21) Appl. No.: 10/518,746

(22) PCT Filed: May 20, 2003

(86) PCT No.: PCT/EP03/05271

§ 371 (c)(1),
(2), (4) Date: Aug. 5, 2005

(87) PCT Pub. No.: WO2004/003355

PCT Pub. Date: Jan. 8, 2004

(65) Prior Publication Data

US 2006/0089783 A1    Apr. 27, 2006

(30) Foreign Application Priority Data

Jun. 27, 2002    (DE) .............................. 102 28 659

(51) Int. Cl.
F01N 11/00    (2006.01)
(52) U.S. Cl. ........................ 701/114; 60/227
(58) Field of Classification Search ................ 701/114; 73/118.1, 119 R; 60/277
See application file for complete search history.

(56) References Cited

U.S. PATENT DOCUMENTS

| | | | |
|---|---|---|---|
| 5,560,200 A | * | 10/1996 | Maus et al. .................. 60/277 |
| 5,600,948 A | * | 2/1997 | Nakajima et al. ............. 60/277 |
| 5,610,844 A | | 3/1997 | Maus et al. |
| 6,357,225 B1 | | 3/2002 | Tanaka |
| 6,739,176 B2 | | 5/2004 | Neuhausen et al. |
| 2001/0033815 A1 | | 10/2001 | Neuhausen et al. |

FOREIGN PATENT DOCUMENTS

| | | |
|---|---|---|
| DE | 42 27 207 A1 | 2/1994 |
| DE | 100 13 893 A1 | 9/2001 |
| EP | 0 442 648 A2 | 8/1991 |
| EP | 0 442 648 A3 | 8/1991 |

* cited by examiner

Primary Examiner—Stephen K. Cronin
Assistant Examiner—Arnold Castro
(74) Attorney, Agent, or Firm—Crowell & Moring LLP

(57) ABSTRACT

A method for monitoring a vehicle exhaust system may include (1) measuring exhaust-gas temperature at an outlet side of an exhaust pipe section which is intended to accommodate a component with a purifying activity, (2) measuring exhaust-gas temperature at an inlet side of the exhaust pipe section, and (3) comparing a time curve of the outlet-side temperature with a time curve of the inlet-side temperature, wherein the comparison comprises determining a time derivative of the outlet-side temperature or of the inlet-side temperature. Alternatively, the method may include (1) measuring exhaust-gas temperature at an outlet side of an exhaust pipe section which is intended to accommodate a component with a purifying activity, (2) determining a calculated value for the exhaust-gas temperature at the outlet side based on at least one of the heat-storing and fluid-dynamic action of the component, and (3) comparing a time curve of the measured outlet-side temperature with a time curve of the calculated value.

20 Claims, 6 Drawing Sheets

METHOD FOR MONITORING AN EXHAUST GAS SYSTEM OF A MOTOR VEHICLE

BACKGROUND AND SUMMARY OF THE INVENTION

The present invention relates to a method for monitoring an exhaust system of a motor vehicle having an internal combustion engine and having monitoring electronics.

German patent publication DE 100 13 893 A1 has disclosed a method for monitoring an exhaust system of a motor vehicle having an internal combustion engine. In this method, the catalytic activity of a catalytic converter arranged as a component with a purifying activity in an exhaust pipe section is assessed. The catalytic activity is assessed by determining the light-off temperature of the carbon monoxide oxidation reaction. The carbon monoxide oxidation reaction process is recorded by corresponding sensors arranged upstream and downstream of the catalytic converter. In addition, the exhaust-gas temperature downstream of the catalytic converter is measured, for which purpose a temperature sensor is arranged at the outlet side of the exhaust pipe section which is intended to accommodate the catalytic converter. Monitoring electronics determine the difference between the exhaust-gas temperature downstream of the catalytic converter and the light-off temperature. The activity of the catalytic converter is assessed on the basis of this result and of the carbon monoxide conversion rate recorded by sensor means, and the exhaust system is monitored in this way.

Patent EP 0 442 648 A2 has disclosed a method for monitoring a catalytic converter, in which the exhaust-gas inlet temperature and the exhaust-gas outlet temperature of the catalytic converter are measured. The measured temperature values are evaluated by forming the difference between them, and this difference is then subjected to an integration operation. The integration operation smooths the temperature curve or the value curves, thereby avoiding misinterpretations.

U.S. Pat. No. 5,560,200 A has disclosed a method for monitoring a catalytic converter, in which the temperature of the support structure of the converter or the temperature of the coating applied to it is determined at least one location. Furthermore, the exhaust-gas temperature is determined upstream of this location, and a time derivative of the temperatures and the difference between the time derivatives are formed. A change in the sign of this difference is interpreted as the catalytic activity of the catalytic converter starting, so that the light-off of the catalytic converter is detected.

Patent EP 0 756 071 A2 has disclosed an apparatus for determining a deterioration in a catalytic converter arranged in an exhaust system. The apparatus comprises a temperature sensor for measuring the catalytic converter temperature and a control unit which gives an estimated value for the catalytic converter temperature. These may be temperatures at the downstream end of the catalytic converter. A conclusion is drawn as to the state of aging of the catalytic converter from the relationship between the measured and estimated catalytic converter temperatures.

By contrast, it is an object of the present invention to provide a method which allows more general monitoring of an exhaust system.

According to the present invention, this object is achieved by a method described and claimed below.

The method according to the invention is distinguished by the fact that the monitoring electronics compare a time curve of the outlet-side exhaust-gas temperature $T2$ with a time curve of an inlet-side exhaust-gas temperature $T1$ at the inlet side of the exhaust pipe section and/or with a time curve of a calculated value $T2^*$ for the exhaust-gas temperature at the outlet side of the exhaust pipe section. The calculated value $T2^*$ is determined on the basis of the heat-storing and/or fluid-dynamic action of the component with a purifying activity.

This procedure makes advantageous use of the phenomenon whereby a component with a purifying activity which is installed in an exhaust pipe section influences the exhaust-gas temperature and its time curve. In this context, a component with a purifying activity will primarily be a particulate filter or an exhaust-gas catalytic converter which influences the exhaust-gas temperature even without the occurrence of reaction exothermicities, on account of its heat-storing action. However, by way of example a switchable cooling circuit or a component which acts passively in some other way, preferably in heat terms, may also be considered as a component with a purifying activity. If heat-storing effects do not occur, by way of example it can be concluded from this that the component is absent. Therefore, if the curves for the temperatures at the inlet side and at the outlet side of the exhaust pipe section are determined and compared with one another in a suitable way, it is possible to assess whether a component with a purifying activity has been installed in this exhaust pipe section. Furthermore, the method according to the invention, by suitable comparison of the temperature curves, makes it possible to indicate any behavior which is unusual in this respect whereby an incorrect component is arranged in the exhaust pipe section. Likewise, the method according to the invention also allows the detection of leaks in the pipe section located between the inlet side and the outlet side, on account of the fluid-dynamic effect of a leak. If irregularities are determined during the monitoring of the exhaust system, it is, of course, possible to provide information to that effect in any desired way, for example in the form of a warning signal.

The comparison referred to may be between a curve of the outlet-side temperature $T2$ and a curve of an inlet-side temperature $T1$. However, it is also possible for the curve of the outlet-side temperature $T2$ to be compared with a curve of a temperature $T2^*$ which is to be expected on the outlet side. The latter is preferably determined with the assistance of models or characteristic diagrams, taking account of thermal and fluid-dynamic aspects and also taking account of the expected behavior of the component with a purifying activity and the current operating state of the motor vehicle. In a similar way, it is also possible, of course, to determine the inlet-side temperature $T1$ and its curve by calculation or with the aid of characteristic diagrams. By contrast, the outlet-side temperature $T2$ is measured directly by means of a suitable measurement sensor on the outlet side of the exhaust pipe section, i.e. within the cross-sectional area which delimits the exhaust pipe section on the outlet side. It is preferable for the time sections in which the comparison of the temperature curves is evaluated to be selected taking additional criteria into account.

In one configuration of the method, the time derivatives $dT1/dt$ and $dT2/dt$ of the inlet-side temperature $T1$ and the outlet-side temperature $T2$ are determined, and the difference $dT1/dt-dT2/dt$ between the derivatives is determined and the result assessed. By forming the time derivatives of the temperatures, it is possible to particularly successfully characterize the curve of the temperatures. The formation of the difference, on the other hand, is particularly suitable for a comparison.

In a further configuration of the method, the monitoring electronics generate a signal which indicates the absence of the component with a purifying activity or the presence of an incorrect component if the difference $dT1/dt-dT2/dt$ between the derivatives is within a predetermined range of values. The basis for this configuration is formed by the discovery that a component with a purifying activity in many operating situations manifests itself as a heat sink or as a heat source. Primarily on account of its heat capacity action, the presence of a component with a purifying activity manifests itself through a greater or lesser, positive or negative difference $dT1/dt-dT2/dt$. If this difference is not observed to a sufficient extent, i.e. if the difference $dT1/dt-dT2/dt$ is within a range of values which is predetermined by two limit values and is preferably relatively small, around zero, it is possible to conclude that a component with a purifying activity is not present in the exhaust pipe section. This is then indicated by the generation and outputting of a corresponding signal. Analogously to this, it is possible to interpret a corresponding deviation from the expected influence of a component with a purifying activity on the temperature curves as meaning that an incorrect component has been fitted, since the correct component would have resulted in a difference outside the predetermined range of values.

In a further configuration of the method, the monitoring electronics generate a signal which indicates the absence of the component with a purifying activity or the presence of an incorrect component if the difference $dT1/dt-dT2/dt$ between the derivatives is within a predetermined range of values and the time derivative $dT1/dt$ of the inlet-side temperature T1 is outside a predetermined range of values. The dynamics of the entry-side temperature curve are also taken into account by taking account of the rate of change $dT1/dt$ of the temperature T1 at the inlet side of the exhaust pipe section when evaluating the difference $dT1/dt-dT2/dt$. Since with high dynamics of the entry-side temperature curve the heat-storing action of a component makes its presence particularly strongly felt in the exhaust pipe section, this also allows a particularly reliable assessment of the exhaust pipe section and therefore makes the conclusion which is drawn particularly reliable. Moreover, influences of exothermicities which may be generated by the component with a purifying activity are advantageously minimized by taking account of the rate of change $dT1/dt$ of the temperature T1 at the inlet side of the exhaust pipe section.

In a further configuration of the method, the monitoring electronics determine the time derivatives $dT2/dt$ and $dT2*/dt$ of the outlet-side exhaust-gas temperature T2 and of the calculated value T2* and determine the difference $dT2*/dt-dT2/dt$ between the derivatives. Accordingly, the rate of change of the temperature T2 at the outlet side of the exhaust pipe section and the rate of change of the temperature T2* to be expected there are determined, and the curve of the temperatures is recorded in this way. The comparison is carried out by forming the difference. It is in this way likewise possible to assess whether a component with a purifying activity is present in the exhaust pipe section or whether an incorrect component is arranged there.

In a further configuration of the method, the monitoring electronics generate a signal which indicates the absence of the component with a purifying activity or the presence of an incorrect component if the difference $dT2*/dt-dT2/dt$ between the derivatives is outside a predetermined range of values. This is possible since if a component with a purifying activity is present, the temperature T2 measured at the outlet side of the exhaust pipe section should correspond to the temperature T2* which is to be expected there and has been determined by calculation. This means that if the expected component is present, a value for the difference $dT2*/dt-dT2/dt$ can be expected to lie within a range of values given by two predeterminable limit values. If this is not the case, it can be assumed that the component which is intended to be provided in the exhaust pipe section is not in fact present.

In a further configuration of the method, the monitoring electronics determine the time derivative $dT1/dt$ of the inlet-side exhaust-gas temperature T1 and generate a signal which indicates the absence of the component with a purifying activity or the presence of an incorrect component if the difference $dT2*/dt-dT2/dt$ between the derivatives is outside a predetermined range of values and the time derivative $dT1/dt$ of the inlet-side temperature is outside a predetermined range of values. The additional inclusion of the rate of change $dT1/dt$ of the inlet-side temperature T1 of the exhaust pipe section in the comparison has the advantage of improving the reliability of the decision which is made.

BRIEF DESCRIPTION OF THE DRAWINGS

In the text which follows, the invention is explained in more detail on the basis of drawings and associated examples.

DETAILED DESCRIPTION OF THE DRAWINGS

Figure 1:
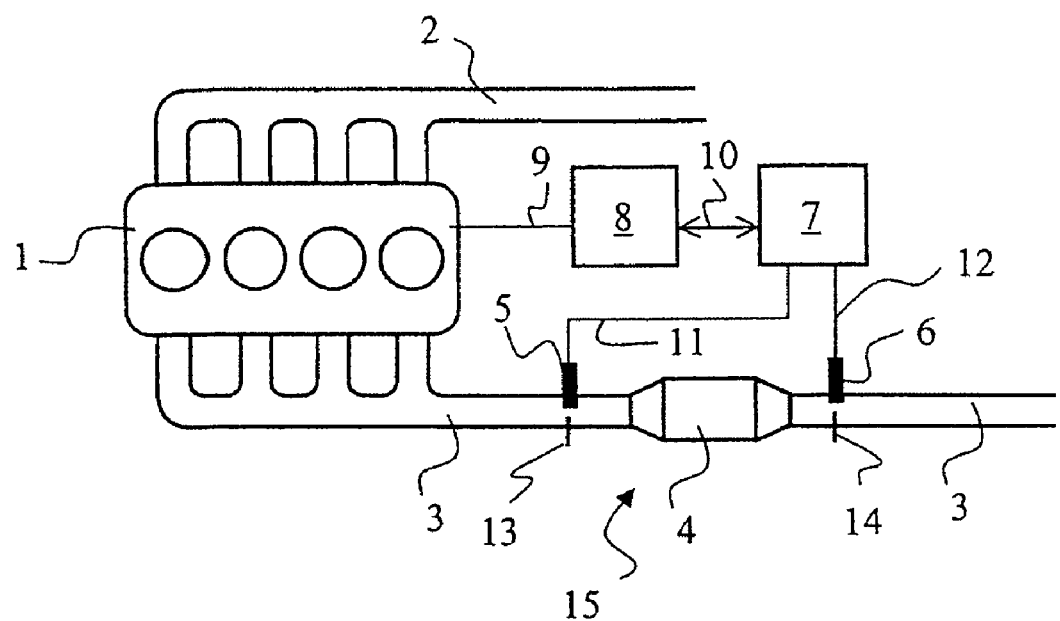
FIG. 1 shows a schematic block diagram of an internal combustion engine having a catalytic converter arranged as component with a purifying activity in an exhaust pipe.

In accordance with FIG. 1, combustion air is fed to an internal combustion engine 1, which in this case is designed, by way of example, with four cylinders, via an intake air line 2. The exhaust gas which is produced in the combustion process is fed via an exhaust pipe 3 to a component 4 with a purifying activity. The component 4 with a purifying activity is designed as an exhaust-gas catalytic converter and is arranged in an exhaust pipe section 15 of the exhaust pipe 3. The exhaust pipe section 15 has an inlet side, denoted by 13, and an outlet side, denoted by 14. A temperature sensor 5 is arranged in the cross-sectional region of the inlet side 13. A further temperature sensor 6 is arranged in the cross-sectional region of the outlet side 14. The internal combustion engine 1, which is designed, for example, as a diesel engine, is assigned an electronic control unit 8 which controls the overall operation of the engine. The control device 8 has the standard options of modern engine control units, and for this purpose in particular includes a calculation unit, a memory unit and input/output units. To realize the control functions, the control unit 8 receives a multiplicity of signals via corresponding signal lines. Only the signal lines 9 and 10 of these are included in FIG. 1. From signal line 9, the control unit 8 receives information about the operating state of the engine 1, in particular information about the engine speed and engine load. The control unit 8 is connected to monitoring electronics 7 via the bidirectional data line 10. The monitoring electronics likewise have a calculation unit which is used to evaluate the measured values from the temperature sensors 5, 6 transmitted via the signal lines 11 and 12. Further components which are used to operate the internal combustion engine 1 and the exhaust system as a whole, such as fuel feed lines, lambda sensors in the exhaust pipe 3 and the like, are not included in FIG. 1, for reasons of clarity. Of course, in addition to the catalytic converter 4 it is also possible for further components for exhaust-gas purification to be arranged in the exhaust pipe 3, but these further components are likewise not illustrated here. Furthermore, it is, of course, also possible for the monitoring electronics 7 to be combined with the control unit 8 to form an integral unit.

In a first embodiment of the method according to the invention, the monitoring electronics 7 determine the curves of the exhaust-gas temperatures T1 and T2 which are on the inlet side and outlet side with respect to the exhaust pipe section 15, these temperatures being recorded by the temperature sensors 5 and 6.

Figure 2:
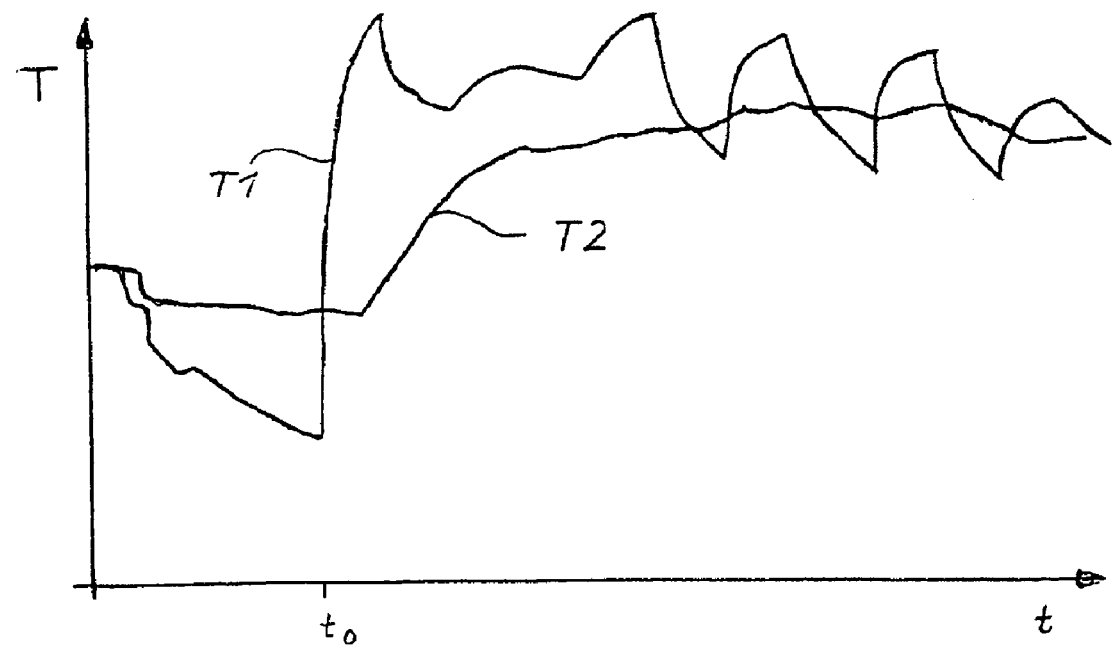
FIG. 2 shows a diagram illustrating the time curves of the temperatures T1 and T2 measured upstream and downstream of a catalytic converter in typical internal combustion engine operation.

The diagram illustrated in FIG. 2 shows the conditions during typical engine operation. The drawing includes the curves of the temperatures T1 and T2 over a time period of approximately 30 minutes. At instant $t_0$, the engine operation suddenly changes from a low load point to a higher load point. Consequently, the temperature of the exhaust gas emitted from the engine 1 suddenly rises at the same time. Therefore, immediately after the load change, the occurrence of a very steep rise in the temperature T1 at the inlet side 13 of the exhaust pipe section 15 in which the catalytic converter 4 is arranged is detected. By contrast, a lower rise in the temperature T2, which has been attenuated in relative terms and moreover occurs with a significant delay, is detected at the outlet side 14. As the curves continue, further, less strong load changes occur during engine operation. These likewise manifest themselves through spontaneous changes in the temperature T1, whereas the changes in the temperature T2 are low by comparison.

It can be seen from the behavior of the temperatures T1 and T2 illustrated that by comparing the curves of the temperatures T1 and T2 it is possible to evaluate or detect whether a component with a purifying activity is present in the exhaust pipe section 15. This component, primarily on account of its heat capacity, influences the temperature of the exhaust gas, so that a different temperature curve occurs at the outlet side 14 of the exhaust pipe section 15 than at the inlet side 13. By contrast, if there is no component with a purifying activity present in the exhaust pipe section, the curves of the temperatures T1 and T2 are virtually identical. It will be clear that the type of component arranged in the exhaust pipe section 15 likewise has an influence on the curve of the temperature T2. Therefore, by means of a suitable comparison of the curves of the temperatures T1 and T2, it is also possible to evaluate the exhaust pipe section with regard to the type of component arranged between the inlet side 13 and outlet side 14. The text which follows provides a more detailed explanation of the procedure according to the invention used in the comparison of the temperature curves.

Figure 3:
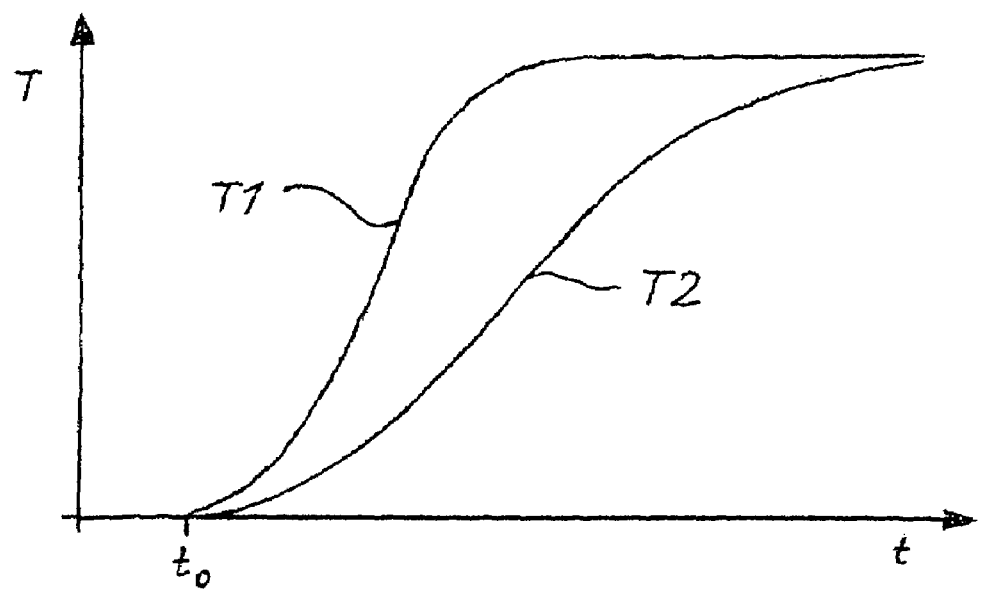
FIG. 3 shows a diagram illustrating the time curves of the temperatures T1 and T2 measured upstream and downstream of a catalytic converter during internal combustion engine operation with a load change from low load to a higher load.

For this purpose, the diagram illustrated in FIG. 3 shows the curve of the temperatures T1 and T2 in the event of a load change in the engine 1 from a low load to a higher load. Steady-state conditions are in each case present before and after the load change. As can be seen from the diagram, the temperature T1 rises steeply after the load change, which took place at instant $t_0$, whereas temperature T2 rises significantly less steeply by comparison. Therefore, over a broad period of time the temperature T2 lags significantly behind the temperature T1. According to the invention, the curves of the temperatures T1 and T2 are compared with one another by forming the time derivatives $dT1/dt$ and $dT2/dt$ and also the difference $dT1/dt - dT2/dt$ between the derivatives, which can be done by carrying out the corresponding calculation operations in the monitoring electronics 7.

Figure 4:
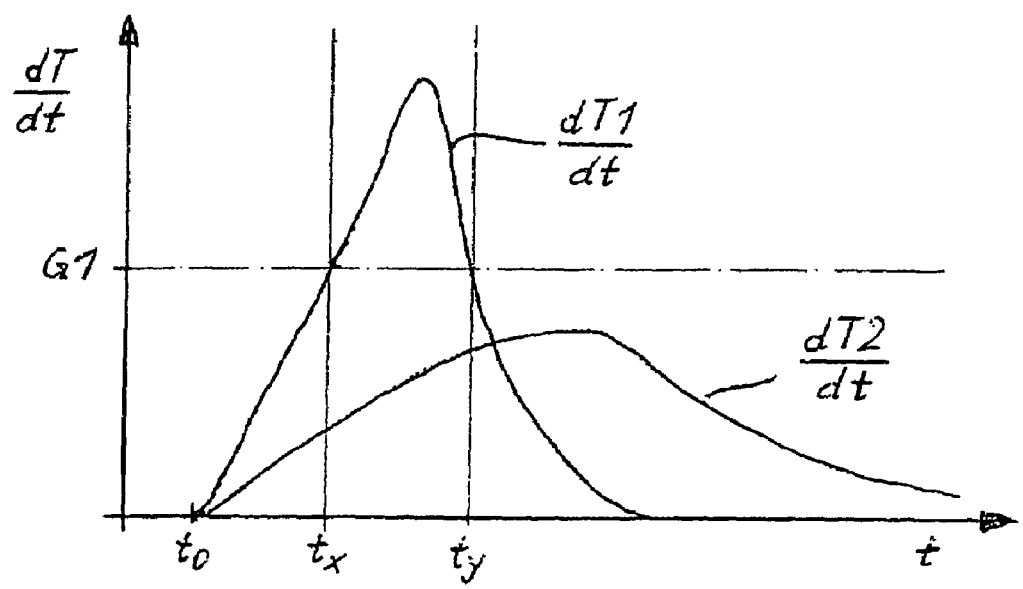
FIG. 4 shows a diagram illustrating the time curves of the time derivatives $dT1/dt$ and $dT2/dt$ of the temperatures T1 and T2 measured upstream and downstream of a catalytic converter during internal combustion engine operation with a load change from low load to a higher load.
Figure 5:
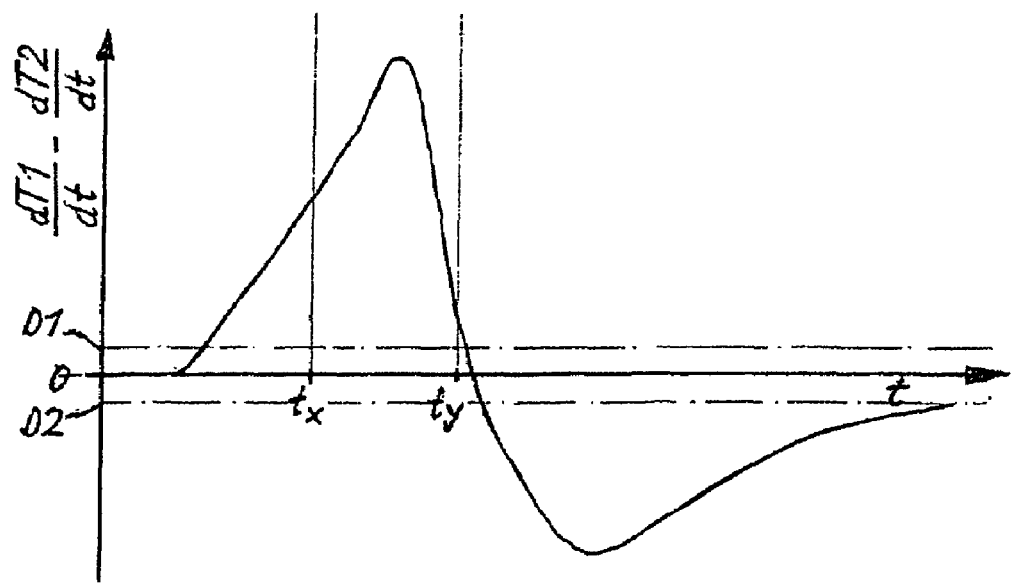
FIG. 5 shows a diagram illustrating the time curves of the difference $dT1/dt-dT2/dt$ between the time derivatives $dT1/dt$ and $dT2/dt$ of the temperatures T1 and T2 measured upstream and downstream of a catalytic converter during internal combustion engine operation with a load change from low load to a higher load.

The diagrams shown in FIG. 4 and FIG. 5 illustrate the resulting relationships. The diagram presented in FIG. 4 shows the curves of the time derivatives $dT1/dt$ and $dT2/dt$ of the temperatures T1 and T2 measured upstream and downstream of the catalytic converter 4 in the event of an engine load change which leads to the temperatures curves discussed in connection with FIG. 3. Forming the time derivatives makes the differences in the curve of the temperatures T1 and T2 even more clearly apparent than in the diagram illustrated in FIG. 3.

The differences are made especially clear by the difference $dT1/dt - dT2/dt$ between the time derivatives $dT1/dt$ and $dT2/dt$ which are illustrated in the diagram presented in FIG. 5. Since the temperature T1 rises rapidly shortly after the load change but the temperature T2 does so only relatively slowly, during this time range a more or less high positive value occurs for the difference $dT1/dt - dT2/dt$ (cf. FIG. 5). However, since the temperature T1 also strives towards or reaches a steady-state value relatively quickly, while the temperature T2 is still rising further, the difference $dT1/dt - dT2/dt$ passes through a pronounced maximum. The value for the difference $dT1/dt - dT2/dt$ then changes sign and becomes negative. A minimum is passed through in the negative range of values, and as steady-state temperature conditions are approached, the difference $dT1/dt - dT2/dt$, starting from negative values, also approaches the zero line.

Accordingly, on account of the presence of the catalytic converter 4, in particular in the event of a load change, comparatively high values for the magnitude of the difference $dT1/dt-dT2/dt$ are generally obtained. This effect is based primarily on the heat-storing action of the catalytic converter 4, whereas exothermicities caused by catalytic reactions in the catalytic converter 4, in particular in the event of a sudden load change, have a minor effect. Conversely, small values for the difference $dT1/dt-dT2/dt$ occur in particular if there is no component in the pipe section 12 to be assessed. It is therefore possible to predetermine a range of values for the difference $dT1/dt-dT2/dt$ within which a signal is generated to indicate the absence of a component with a purifying activity in the pipe section 12. The limit values D1 and D2 which delimit a range of values of this type are included in the diagram shown in FIG. 5.

It is preferable for the signal to indicate the a component is absent to be generated only if the difference $dT1/dt-dT2/dt$ is within the range of values predetermined by the limit values D1 and D2 and at the same time specific conditions, such as for example specific engine operating conditions, are present. By way of example, it is possible to prevent a signal indicating the absence of a component with a purifying activity from being output if steady-state engine operating conditions are present for a predeterminable time, or the extent of a load change can also be taken into account. Furthermore it is advantageous to take into account the exhaust gas mass flow when stipulating the limit values D1 and D2.

Furthermore, it is particularly preferable for the curve of the temperature T1 and/or the time derivative $dT1/dt$ also to be taken into account. For this purpose, a range of values for the time derivative $dT1/dt$ of the temperature T1 at the inlet side 13 of the exhaust pipe section 15 is predetermined. This range of values for the time derivative $dT1/dt$ for the temperature T1 is likewise defined by a variably predetermined upper limit value and by a variably predetermined lower limit value. An upper limit value, in this case, denoted by G1, is also plotted in the diagram shown in FIG. 4. The associated lower limit value is preferably negative and is consequently not plotted in the diagram shown in FIG. 4. Therefore, with the limit values G1, D1, D2 plotted in the diagrams shown in FIGS. 4 and 5, in the time range between $t_x$ and $t_y$ (cf. FIGS. 4 and 5) the criterion which is the determining factor for the generation and outputting of a fault signal indicating "component with a purifying activity absent" is in this case fulfilled. On account of the fact that the rate of change $dT1/dt$ of the exhaust-gas temperature T1 upstream of the catalytic converter 4 is also taken into account, it is possible to avoid a misdiagnosis caused by influences of heat of reaction, since the release of heat of reaction in the catalytic converter 4 has no effect on the inlet-side temperature T1.

Figure 6:
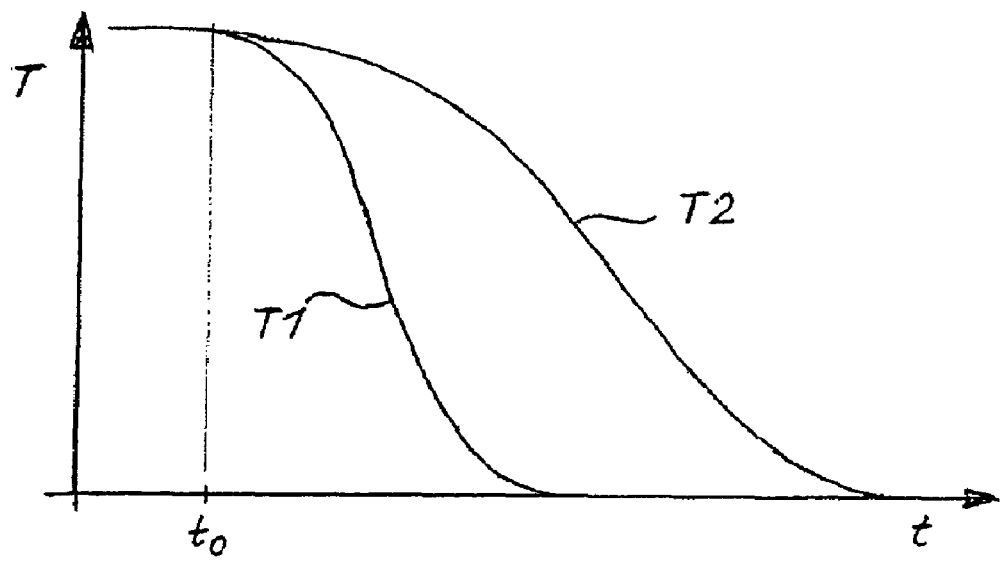
FIG. 6 shows a diagram illustrating the time curves of the temperatures T1 and T2 measured upstream and downstream of a catalytic converter during internal combustion engine operation with a load change from a higher load to low load.

Analogously to FIG. 3, the diagram illustrated in FIG. 6 shows the curve of the temperatures T1 and T2 in the event of a load change in the engine 1 from a higher load to a low load. Steady-state conditions are in each case present before and after the load change. As can be seen from the diagram, the temperature T1 drops steeply after the load change, which took place at instant $t_0$, since on account of the lower engine load on the engine 1 an exhaust gas at a lower temperature is emitted. By comparison, the temperature T2 drops significantly less steeply. The reason for this is primarily the heat storage capacity of the catalytic converter 4. The catalytic converter 4, which has been heated up to a relatively high temperature, slowly releases the stored heat to the now cooler exhaust gas flowing through it. Consequently, over a broad period of time the temperature T2 is significantly higher than the temperature T1. According to the invention, the curves of the temperatures T1 and T2 are compared with one another by forming the time derivatives $dT1/dt$ and $dT2/dt$ and the difference $dT1/dt-dT2/dt$, which can be done by carrying out the corresponding calculation operations in the monitoring electronics 7.

Figure 7:
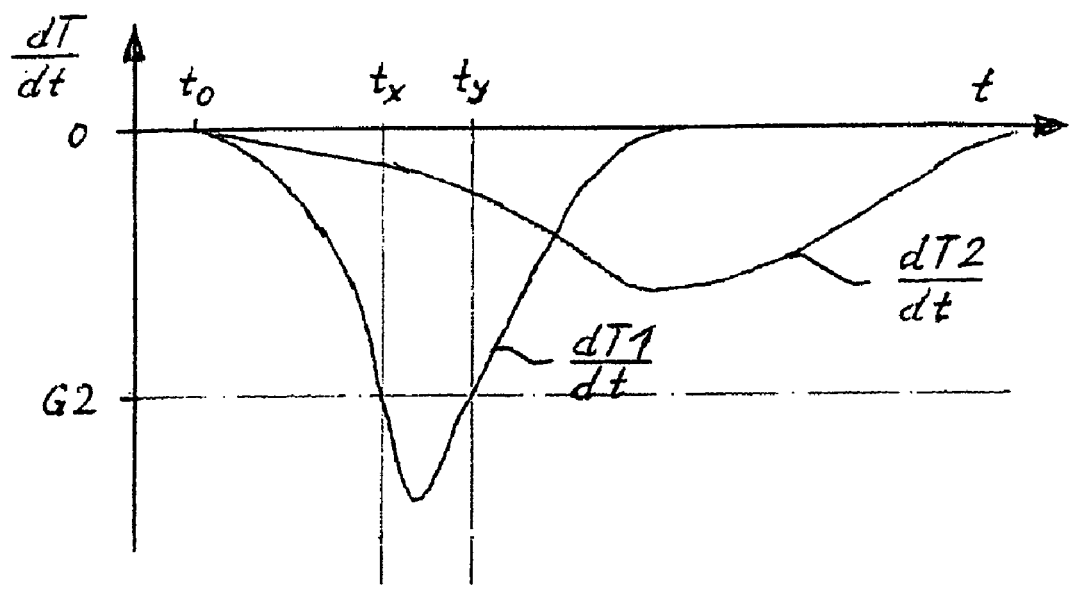
FIG. 7 shows a diagram illustrating the time curves of the time derivatives $dT1/dt$ and $dT2/dt$ of the temperatures T1 and T2 measured upstream and downstream of a catalytic converter during internal combustion engine operation with a load change from a higher load to low load.
Figure 8:
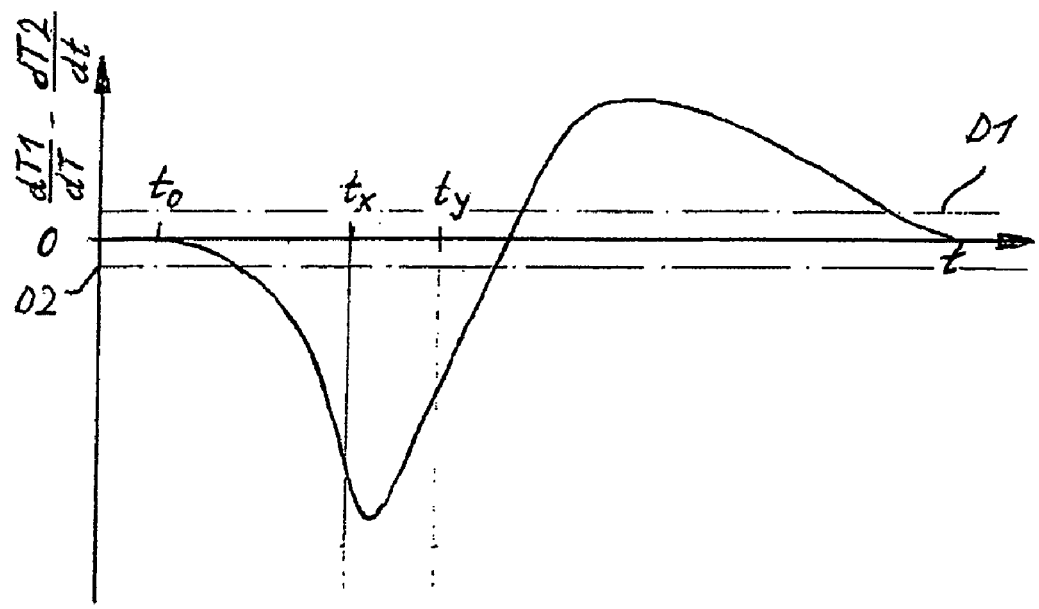
FIG. 8 shows a diagram illustrating the time curves of the difference $dT1/dt-dT2/dt$ between the time derivatives $dT1/dt$ and $dT2/dt$ of the temperatures T1 and T2 measured upstream and downstream of a catalytic converter during internal combustion engine operation with a load change from a higher load to low load.

The diagrams illustrated in FIG. 7 and FIG. 8 show the resulting relationships. The diagram shown in FIG. 7 illustrates the curves of the time derivatives $dT1/dt$ and $dT2/dt$ of the temperatures T1 and T2 measured upstream and downstream of the catalytic converter 4 in the event of an engine load change which leads to the temperature curves discussed in FIG. 6. Forming the time derivatives makes the differences in the curve of the temperatures T1 and T2 even more clearly apparent than in the diagram illustrated in FIG. 6. The differences become especially evident from the difference $dT1/dt-dT2/dt$ between the time derivatives $dT1/dt$ and $dT2/dt$ illustrated in the diagram presented in FIG. 8. Since the temperature T1 drops rapidly shortly after the load change, whereas the temperature T2 drops only relatively slowly, in this time range a more or less great negative value occurs for the difference $dT1/dt-dT2/dt$ (cf. FIG. 8). However, since the temperature T1 also strives towards or reaches a steady-state value relatively quickly while the temperature T2 is still dropping further, the difference $dT1/dt-dT2/dt$ passes through a pronounced minimum. Then, the value for the difference $dT1/dt-dT2/dt$ changes sign and becomes positive. A maximum is passed through in the positive range of values, and as steady-state temperature conditions are approached, the difference $dT1/dt-dT2/dt$, starting from positive values, also approaches the zero line. Accordingly, on account of the presence of the catalytic converter 4, in particular in the event of a load change, relatively high values are generally obtained for the magnitude of the difference $dT1/dt-dT2/dt$. Conversely, small values occur for difference $dT1/dt-dT2/dt$ in particular if there is no component in the pipe section 15 to be assessed. It is therefore possible to predetermine a range of values for the difference $dT1/dt-dT2/dt$ within which a signal indicating the absence of a component with a purifying activity in the pipe section 15 is generated. A range of values defined by the predeterminable limit values D1 and D2 is included in the diagram shown in FIG. 8.

Analogously to the relationships described above in the event of a load change from low load to a higher load, it is also possible in the opposite scenario to take additional account of certain engine operating parameters with regard to the outputting of a signal indicating the absence of a component with a purifying activity. The limit values G1, D1, D2 can also be predetermined as a function of the engine operating conditions or as a function of the exhaust-gas mass flow.

In addition, it is particularly preferable also to take into account the curve of the temperature T1 or the time derivative $dT1/dt$. For this purpose, a range of values is predetermined for the time derivative $dT1/dt$ for the temperature T1 at the inlet side 13 of the exhaust pipe section 15. The lower limit value G2, which delimits the range of values for the time derivative $dT1/dt$ of the temperature T1, is plotted in the diagram shown in FIG. 7. Therefore, with the limit values G1, D1, D2 plotted in the diagrams shown in FIGS. 7 and 8, in the time range between $t_x$ and $t_y$ (cf. FIGS. 7 and 8), the criterion which is crucial with regard to the generation and outputting of a fault signal indicating "component with a purifying activity absent" is likewise satisfied.

Figure 9:
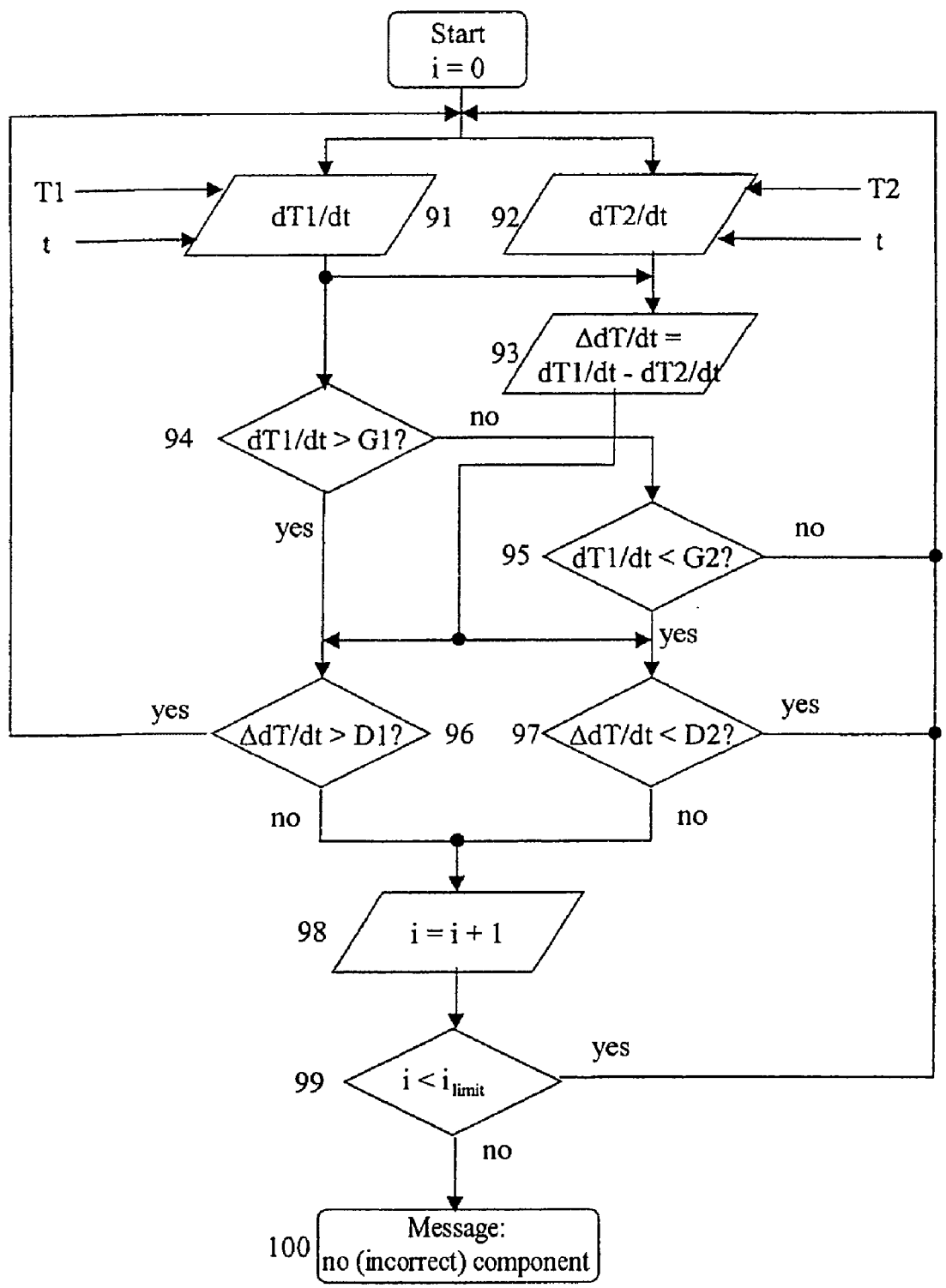
FIG. 9 shows a flow diagram for a preferred procedure when carrying out the method according to the invention.

The method sequence for the preferred procedure which has been outlined is reproduced in the flow diagram shown in FIG. 9. According to this flow diagram, the method is started by setting a counter i to the starting value zero. In the next method step 91 or 92, the monitoring electronics 7, over a time period of selectable duration, read the temperatures T1 and T2 and the current system time t and determine the values for the time derivatives dT1/dt and dT2/dt. In block 93, the difference ΔdT/dt=dT1/dt−dT2/dt is determined from these values. Block 94 asks whether the rate of change dT1/dt of the temperature T1 in the inlet region 13 of the pipe section 15 exceeds the predeterminable limit value G1, i.e. whether there is a correspondingly steep temperature rise. If so, block 96 asks whether the difference ΔdT/dt exceeds the predeterminable limit value D1. If so, no fault is detected and the method returns to the start.

If the result of the question asked in block 94 is that the rate of change dT1/dt of the temperature T1 does not exceed the predeterminable limit value G1, block 95 then asks whether it is below the predeterminable limit value G2. If this question, just as in block 94, is likewise answered by "no", at least approximately steady-state conditions are present. The exhaust pipe section 15 is then not assessed for the presence of a component with a purifying activity, and the method returns to the start of the routine. If the result of the question asked in block 95 shows that the rate of change dT1/dt of the temperature T1 is below the limit value G2, block 97 then asks whether the difference ΔdT/dt is below the predeterminable limit value D2. If this is likewise the case, no fault is detected and the method returns to the start.

If the questions in block 96 or in block 97 are answered by "no", an anomaly is present, since a difference lying outside the range of values delimited by D1 and D2 was to be expected. To rule out the influence of random factors, the counter i is incremented (block 98) and it is asked whether a limit value $i_{limit}$ has already been reached (block 99), i.e. whether the result indicating the anomaly has occurred a sufficient number of times. If so, the end of the routine is reached at block 100, and the fault message "component with a purifying activity absent" or "incorrect component" is output.

It will be understood that the temperature T1 does not necessarily have to be determined by measurement. Rather, it is also possible for the temperature value or temperature curve which is present at the inlet side 13 of the exhaust pipe section 15 that is to be evaluated to be determined by calculation by forming a model or on the basis of characteristic diagrams for the engine operation or in some other way. It will also be understood that a procedure of this type can also be used to evaluate whether a component of the wrong type is arranged in the exhaust pipe section 15. This is the case if, under non-steady-state engine operating conditions, the component acts as a stronger or weaker heat source or heat sink than the component intended to be provided in the pipe section 15. To achieve sufficiently reliable assessment in this respect, it is possible, for example, to adapt the limit values D1, D2, G1, G2. By way of example, the range determined by the limit values G1, G2 can be increased.

In a second embodiment of the method according to the invention, the monitoring electronics 7 provide a calculated value T2* for the temperature at the outlet side 14 of the exhaust pipe section 15 which is to be assessed. Therefore, depending on the operating conditions of the engine, the result is a curve for the temperature T2* which is determined by calculation and which is compared with the curve of the temperature T2 measured at the outlet side of the exhaust pipe section 12. Analogously to the first embodiment of the method according to the invention, in this case too the time derivatives of the temperatures and the difference between the values obtained are formed. The determined value dT2*/dt−dT2/dT is then checked for plausibility. In this case too, this check may be linked to the presence of engine, fluid-dynamic or heat-storing criteria. In this case, the value is plausible if the difference dT2*/dt−dT2/dT is within a range of values determined by optionally predetermined limit values D1 and D2. In this case, the normal performance of the intended component is established.

Figure 10:
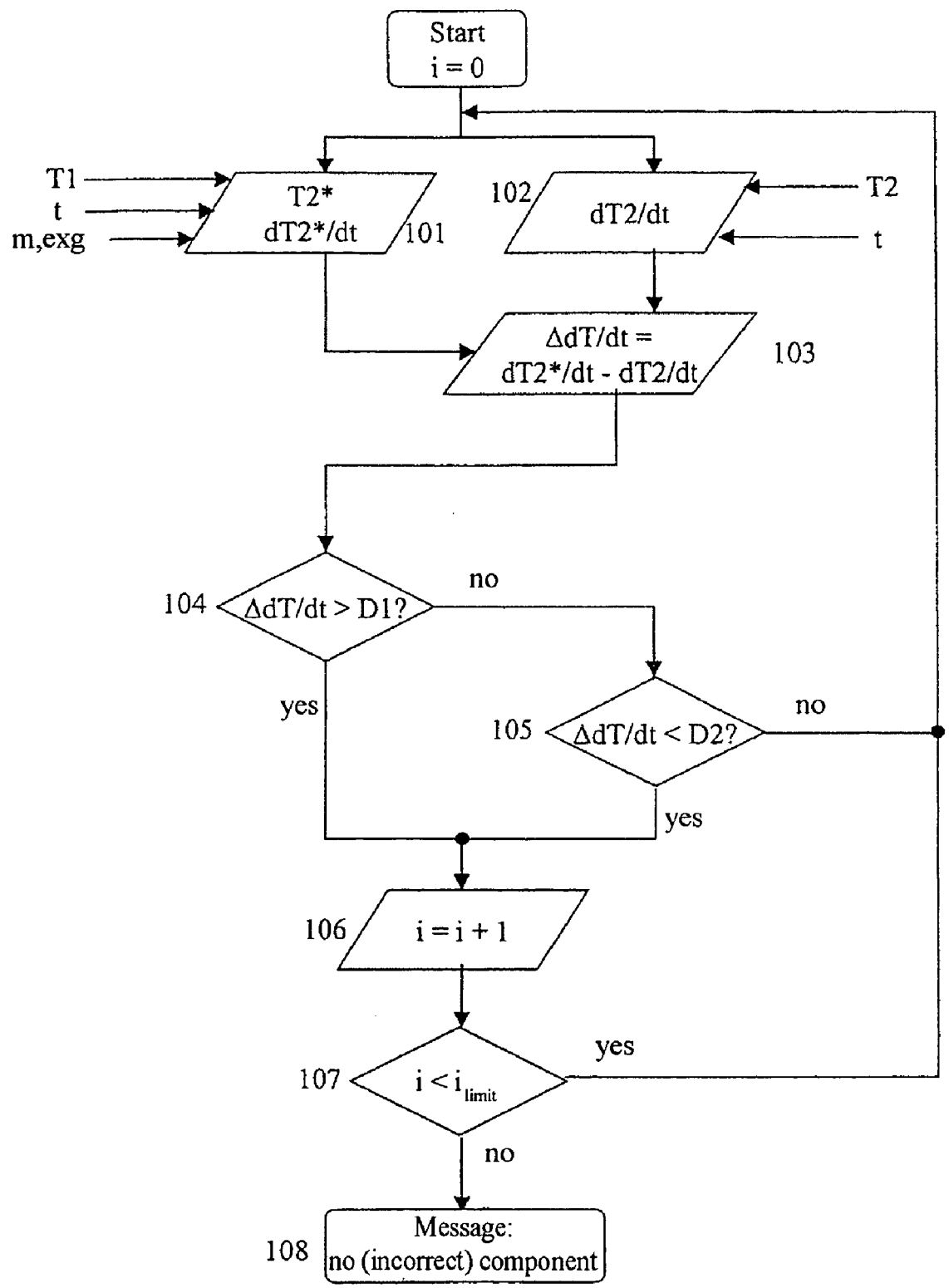
FIG. 10 shows a further flow diagram for a further preferred procedure when carrying out the method according to the invention.

An advantageous procedure is reproduced by the flow diagram illustrated in FIG. 10. In this case, in block 101 an expected value T2* for the outlet-side temperature T2 and its time derivative dT2*/dt are determined using various input data, such as T1 (inlet-side temperature), t (system time), $\dot{m}_{eng}$ (exhaust gas mass flow). The rate of change dT2/dt of the temperature T2 is determined in block 102 on the basis of the measured value supplied by the measurement sensor 6 and the system time t. Block 103 determines the difference ΔdT/dt=dT2*/dt−dT2/dT from these values. Blocks 104 and 105 respectively ask whether this difference is above an upper limit value D1 and below a lower limit value D2. If the answer is no in both cases, the exhaust pipe section 15 is found to be in order, since there is no deviation from the expected, normal behavior. Therefore, in this case the method returns to the start of the routine. However, if either of the questions is answered by "yes", an anomaly is detected, since the curve of the temperature T2 deviates to a relatively large extent from the expected, calculated curve. In this case, the counter i is incremented in block 106 and it is then asked whether a $i_{limit}$ value limit has already been reached (block 107), i.e. whether the result indicating the anomaly has occurred a sufficient number of times. If so, the end of the routine is reached at block 108, and the fault message "absent or incorrect component" is output.

It is particularly advantageous also to take account of a specific range of values for the rate of change dT1/dt of the temperature T1. The absence of a component with a purifying activity or the presence of an incorrect component is detected if the value for dT1/dt is outside a range of values which can be defined by means of optionally predetermined limit values and at the same time the difference dT2*/dt−dT2/dT is likewise outside a range of values which can be defined by optionally predeterminable limit values. Therefore, it is additionally asked whether there is a sufficiently steep change in temperature at the inlet side 13 of the exhaust pipe section 15 to be evaluated, and this information is also taken into account. If these limit values are once again denoted by G1, G2 and D1, D2, the procedure in the flow diagram shown in FIG. 10 can be analogous to that adopted in the flow diagram show in FIG. 9.

It will be understood that the procedure described can also be used to monitor a plurality of exhaust pipe sections of the exhaust system as a whole. The exhaust pipe sections may be arranged in parallel or in series. If they are arranged in series, the temperature curve at the outlet side of one pipe section can also be considered as the temperature curve at the inlet side of the following pipe section.

The invention claimed is:

1. A method for monitoring an exhaust system of a motor vehicle, comprising:
    measuring exhaust-gas temperature at an outlet side of an exhaust pipe section which is intended to accommodate a component with a purifying activity;
    determining a calculated value for the exhaust-gas temperature at the outlet side of the exhaust pipe section on the basis of at least one of the heat-storing and fluid-dynamic action of the component with a purifying activity; and comparing a time curve of the measured outlet-side exhaust-gas temperature with a time curve of the calculated value for the exhaust-gas temperature at the outlet side.

2. The method as claimed in claim 1, further comprising determining the time derivative of the outlet-side exhaust-gas temperature, the time derivative of the calculated temperature, and the difference between the derivatives.

3. The method as claimed in claim 2, further comprising generating a signal which indicates the absence of the component with a purifying activity or the presence of an incorrect component if the difference between the derivatives is outside a predetermined range of values.

4. The method as claimed in claim 1, determining the time derivative of the outlet-side exhaust-gas temperature, the time derivative of a measured inlet-side exhaust-gas temperature at an inlet side of the exhaust pipe section, and the time derivative of the calculated value for the exhaust-gas temperature at the outlet side of the exhaust pipe section, and generating a signal which indicates the absence of the component with a purifying activity or the presence of an incorrect component if the difference between the derivatives is outside a predetermined range of values and the time derivative of the inlet-side exhaust-gas temperature is outside a predetermined range of values.

5. The method as claimed in claim 1, further comprising determining the time derivative of the outlet-side exhaust-gas temperature, the time derivative of a measured inlet-side exhaust-gas temperature at an inlet-side of the exhaust pipe section, and the time derivative of a calculated value for the exhaust-gas temperature at the outlet-side of the exhaust pipe section, and generating a signal which indicates the absence of the component with a purifying activity or the presence of an incorrect component if the difference between the time derivatives of the calculated and the measured value for the outlet-side exhaust-gas temperature is outside a predetermined range of values and the time derivative of the inlet-side exhaust-gas temperature is outside a predetermined range of values.

6. A method for monitoring an exhaust system of a motor vehicle having an internal combustion engine and having monitoring electronics, a temperature sensor for measuring an outlet-side exhaust-gas temperature being arranged at the outlet side of an exhaust pipe section which is intended to accommodate a component with a purifying activity, and the monitoring electronics compare a time curve of the outlet-side exhaust-gas temperature with a time curve of a calculated value for the exhaust-gas temperature at the outlet side of the exhaust pipe section, wherein the calculated value is determined on the basis of the heat-storing and/or fluid-dynamic action of the component with a purifying activity.

7. The method as claimed in claim 6, wherein the monitoring electronics determine the time derivatives and of the outlet-side exhaust-gas temperature and of the calculated temperature and the difference between the derivatives.

8. The method as claimed in claim 7, wherein the monitoring electronics generate a signal which indicates the absence of the component with a purifying activity or the presence of an incorrect component if the difference between the derivatives is outside a predetermined range of values.

9. The method as claimed in claim 6, wherein the monitoring electronics determine the time derivatives and of the inlet-side exhaust-gas temperature and of the outlet-side exhaust-gas temperature and also the time derivative of the calculated value for the exhaust-gas temperature at the outlet side of the exhaust pipe section and generate a signal which indicates the absence of the component with a purifying activity or the presence of an incorrect component if the difference between the derivatives is outside a predetermined range of values and the time derivative of the inlet-side exhaust-gas temperature is outside a predetermined range of values.

10. The method as claimed in claim 6, wherein the monitoring electronics determine the time derivatives of the outlet-side exhaust-gas temperature and of the calculated temperature and the difference between the derivatives.

11. The method as claimed in claim 10, wherein the monitoring electronics generate a signal which indicates the absence of the component with a purifying activity or the presence of an incorrect component if the difference between the derivatives is outside a predetermined range of values.

12. The method as claimed in claim 6, wherein the monitoring electronics determine the time derivatives of an inlet-side exhaust-gas temperature and of the outlet-side exhaust-gas temperature and also the time derivative of the calculated value for the exhaust-gas temperature at the outlet-side of the exhaust pipe section and generate which indicates the absence of the component with a purifying activity or the presence of an incorrect component if the difference between the derivatives of the calculated and the measured value for the outlet-side exhaust-gas temperature is outside a predetermined range of values and the time derivative of the inlet-side exhaust-gas temperature is outside a predetermined range of values.

13. A method for monitoring an exhaust system of a motor vehicle, comprising:

measuring an exhaust-gas temperature at an outlet side of an exhaust pipe section which can accommodate a component with a purifying activity;

measuring an exhaust-gas temperature at an inlet side of the exhaust pipe section;

carrying out a comparison of a time curve of the outlet-side exhaust-gas temperature with a time curve of the inlet-side exhaust-gas temperature; and generating a signal if an evaluation of said comparison indicates the absence of the component with a purifying activity or the presence of an incorrect component.

14. The method as claimed in claim 13, wherein the comparison of the time curves comprises the determination of a time derivative of the outlet-side exhaust-gas temperature or of the inlet-side exhaust-gas temperature.

15. The method as claimed in claim 14, further comprising determining both the time derivative of the measured outlet-side and inlet-side exhaust-gas temperature, and determining the difference between the tine derivatives.

16. The method as claimed in claim 15, wherein the signal is generated if the difference between the derivatives is within a predetermined range of values.

17. The method as claimed in claim 15, wherein the signal is generated if the difference between the derivatives is within a predetermined range of values and the time derivative of the inlet-side exhaust-gas temperature is outside a predetermined range of values.

18. The method as claimed in claim 14, further comprising determining the time derivative of the measured outlet-side and inlet-side exhaust-gas temperatures, and the time derivative of a calculated value for the exhaust-gas temperature at the outlet-side of the exhaust pipe section, wherein the signal is generated if the difference between the time derivatives of the calculated and the measured value for the outlet-side exhaust-gas temperature is outside a predetermined range of values and the time derivative of the inlet-side exhaust-gas temperature is outside a predetermined range of values.

19. A method for monitoring an exhaust system of a motor vehicle having an internal combustion engine and having monitoring electronics, a temperature sensor for measuring an outlet-side exhaust-gas temperature being arranged at the outlet-side of an exhaust pipe section which is intended to accommodate a component with a purifying activity, and the monitoring electronics compare a time curve of the outlet-side exhaust-gas temperature with a time curve of an inlet-side exhaust-gas temperature at the inlet side of the exhaust pipe section, wherein the monitoring electronics;

determine the time derivatives of the inlet-side exhaust-gas temperature and the outlet-side exhaust-gas temperature and the difference between the derivatives, and generate a signal which indicates the absence of the component with a purifying activity or the presence of an incorrect component if the difference between the derivatives is within a predetermined range of values.

20. The method as claimed in claim 19, wherein the signal is generated if the difference between the derivatives is within a predetermined range of values and the time derivative of the inlet-side exhaust-gas temperature is outside a predetermined range of values.

* * * * *